W. T. DULANY, Jr.
SPRING WHEEL.
APPLICATION FILED JUNE 29, 1911.
1,029,177.
Patented June 11, 1912.
2 SHEETS—SHEET 2.
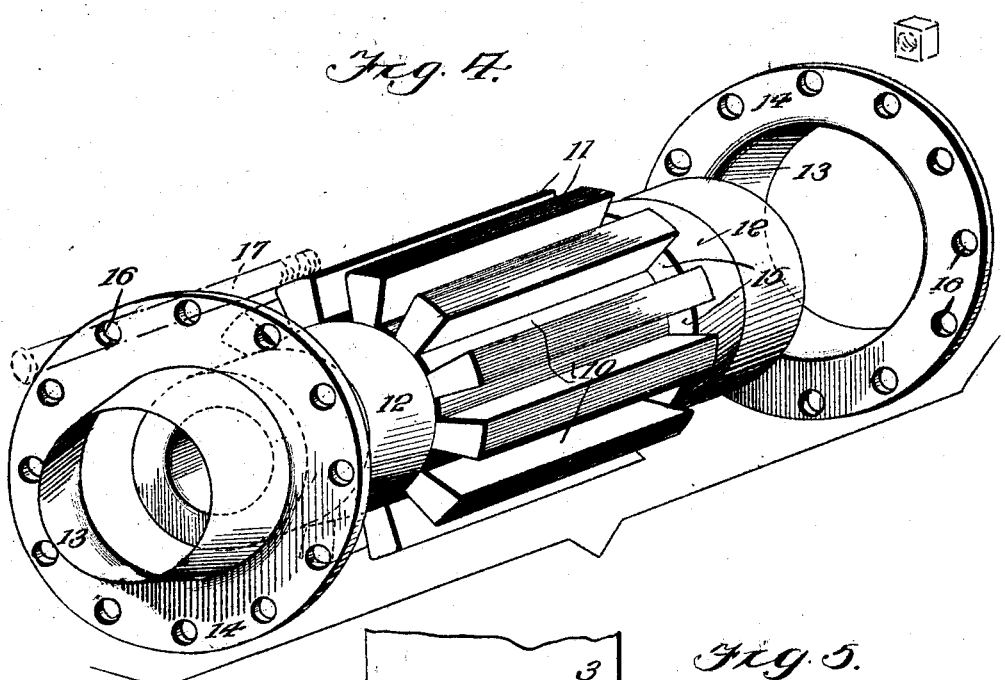
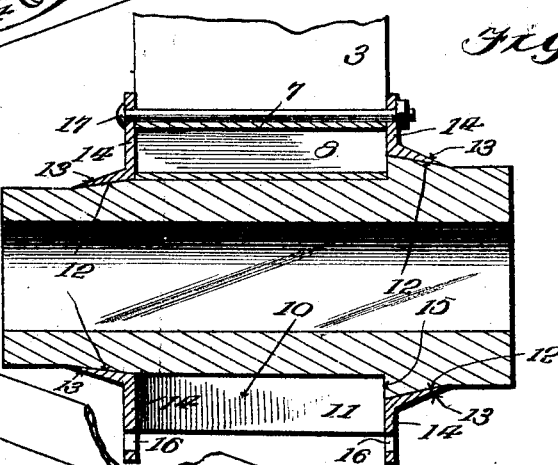
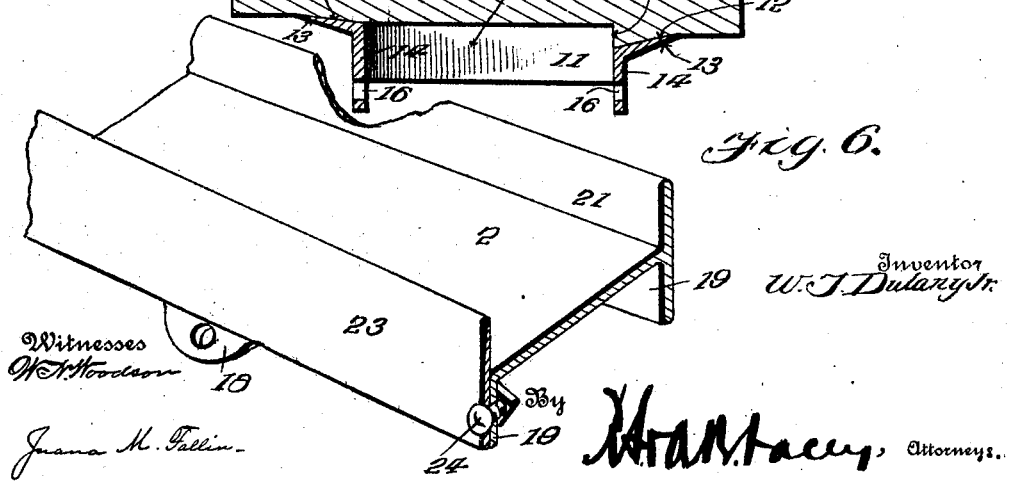
Witnesses
Inventor
W. T. Dulany Jr.
By
Attorneys.

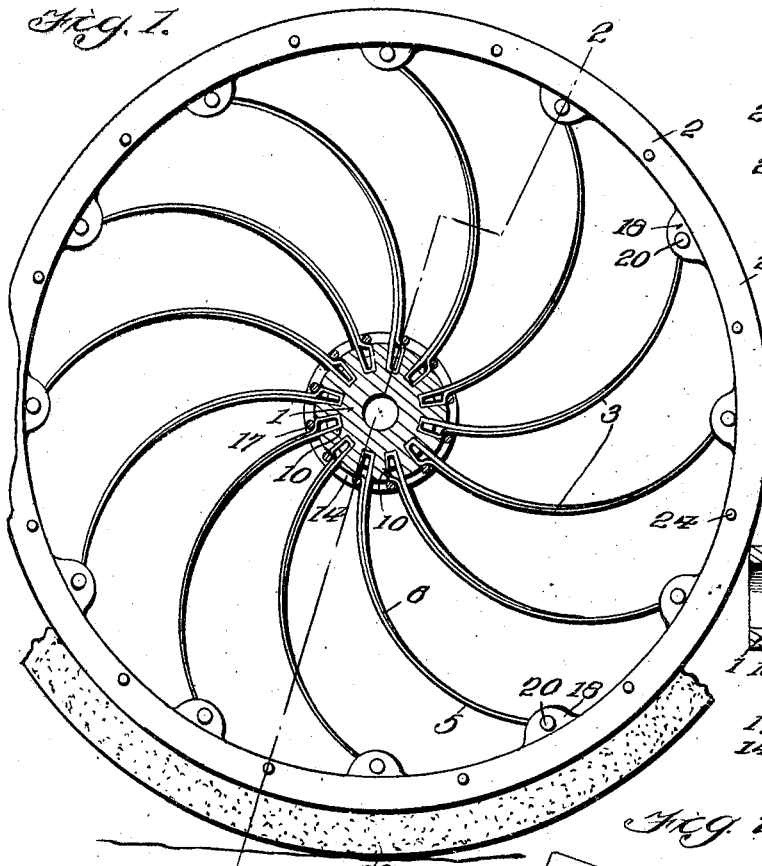
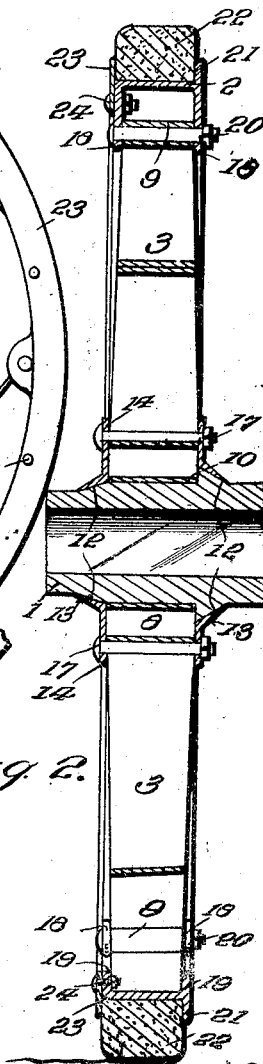
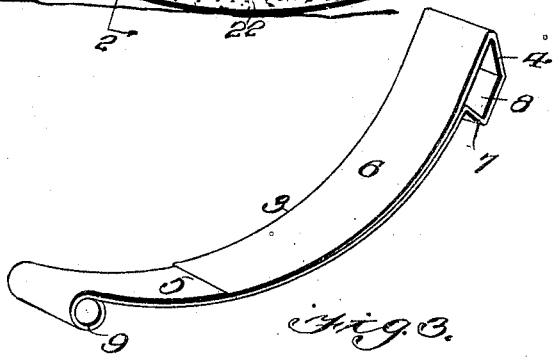

UNITED STATES PATENT OFFICE.

WILLIAM T. DULANY, JR., OF ARLINGTON, NEW JERSEY.

SPRING-WHEEL.

1,029,177.  Specification of Letters Patent.  Patented June 11, 1912.

Application filed June 29, 1911. Serial No. 636,077.

*To all whom it may concern:*

Be it known that I, WILLIAM T. DULANY, Jr., a citizen of the United States, residing at Arlington, in the county of Hudson and State of New Jersey, have invented certain new and useful Improvements in Spring-Wheels, of which the following is a specification.

The present invention comprehends certain new and useful improvements in vehicle wheels, and the object of the invention is to provide a wheel having improved spring spokes which afford a maximum resiliency of structure so as to absorb the shocks incident to travel and avoid the use of the customary pneumatic tire.

Another object of the invention is to provide spring spokes which are simple, durable and inexpensive in construction and which are detachably connected to the hub and the rim in a particularly efficient manner.

With these and other objects in view, as will more fully appear as the description proceeds, the invention consists of certain constructions, arrangements and combinations of the parts that I shall hereinafter fully describe and claim.

For a full understanding of the invention, reference is to be had to the following description and accompanying drawing, in which:

Figure 1 is a side elevation of my improved wheel, parts being shown in section. Fig. 2 is a transverse section on the line 2—2 of Fig. 1, and Fig. 3 is a detail view of one of the spokes detached. Fig. 4 is an enlarged perspective view of the hub showing the parts in juxtaposition; Fig. 5 is a longitudinal section of the hub; and Fig. 6 is a fragmentary perspective view of the rim.

Corresponding and like parts are referred to in the following description and indicated in all the views of the accompanying drawing by the same reference characters.

My improved wheel comprises a hub 1, a rim 2, and a series of spring spokes 3 which are similarly curved in the plane of the wheel so as to face in the same circular direction, the spokes being rigidly secured to the hub and being pivotally connected to the rim. As all of the spokes are substantial duplicates only one of the same will be specifically described. The spoke is formed from a bar of steel or other suitable metal which is doubled upon itself at an intermediate point, to provide a return-bend 4 and co-acting leaves 5 and 6, the leaf 6 being somewhat shorter than the leaf 5. In proximity to the return-bend the leaf 5 is offset laterally, as indicated at 7, and between this offset and the bend the leaves are spaced apart transversely to constitute a frame-like head 8 that is preferably slightly wedge-shape as shown. Beyond the head the leaves are similarly curved and the shorter leaf 6 lies snugly against and gradually merges into the concave face of the leaf 5. The head 8 projects laterally on the opposite side of the spoke from the leaf 6 and the offset 7 forms an abrupt shoulder which faces in the direction of the length of the spoke. At its extremity the leaf 5 is returned upon itself on its convex face to provide a transversely extending tubular bearing sleeve 9.

In order to connect the spokes to the hub an annular series of spoke sockets 10 are formed in and open outwardly through the periphery of the relatively large middle portion 11 of the hub, and are preferably slightly tapered to conform to the contour of the heads 8 and to enable the heads to be fitted snugly therein with a wedging action. The sockets open outwardly through both side faces of the middle portion 11, as shown. At the juncture of each reduced end portion of the hub with the middle portion, there is provided a peripheral bearing surface 12 which is of truncated conical form and tapers away from the middle portion. The bearing surface on the outer side of the middle portion lies entirely within the circle of the bottom wall of each spoke socket 10 so as not to interfere with the insertion of the spoke heads 8 into the sockets from the outer side of the wheel. However, the bearing surface on the inner side of the middle portion is of somewhat greater diameter than the other bearing surface and projects beyond the bottom walls of the sockets to provide shoulders 15 at the inner ends of the sockets to limit the lateral movement of the spokes toward the inner side of the wheel. Collars 13 of truncated conical form are slipped over the reduced ends of the hub and seated on the respective bearing surfaces, said collars being formed at their larger ends with outstanding circumferential spoke flanges 14 abutting against the adjacent side faces of the middle portion of the hub and closing the open ends of the spoke sockets. These spoke flanges project outwardly beyond the periphery of the middle portion of the hub and are formed opposite each spoke socket with a pair of transversely registering apertures 16 for the reception of a transverse tie bolt 17. By tightening the bolts 17 the spoke flanges are drawn together and held firmly against the middle portion 11, while the collars 13 are clamped on the bearing surfaces 12. Each of the bolts also bears against the convex face of the adjacent spoke, and is suitably positioned to abut against the offset 7, in order to retain the head of the spoke against withdrawal from the socket.

The outer end of each spoke is interposed between a pair of transversely spaced ears 18 which are extended from and are integral with the inner edges of inwardly projecting side flanges 19 of the rim. A bolt 20 is secured between the ears and passed through the tubular sleeve 9, whereby to establish a pivotal connection between the spoke and the rim. The advantage of such pivotal connections is that they afford slight play between the parts to enable the spokes to accommodate themselves to the rim at all times during the operation of the wheel. The rim is also formed at one side edge with an outstanding flange 21 which lies in the plane of the adjacent inwardly projecting flange 19 and which bears against one side of a cushion tire 22 encircling the periphery of the rim. A clamping ring 23 lies against the other side of the tire to confine the same in place, said clamping ring being separate from the rim and being detachably secured thereto to admit of the removal of the tire when occasion requires. For this purpose the clamping ring is of a size to overlap the outer face of the flange 19 at the corresponding side of the wheel and is attached thereto by bolts or like fastening devices 24.

From the foregoing description in connection with the accompanying drawing, it will be apparent that the spring spokes will yield freely under pressure to absorb the shocks incident to travel and thus prevent any undue jolting of the occupants of the vehicle, without the necessity of employing the usual pneumatic tire that has been found so objectionable in practice. The leaf 6 which lies against the concave face of the leaf 5, adds materially to the strength and durability of the spoke. Furthermore, as the leaf 6 merges gradually into the leaf 5 and terminates considerably short of the outer end of the spoke the elasticity of the outer portion of the spoke is increased. It will be understood, of course, that the number and size of the spokes may be varied in different wheels, in proportion to the maximum load which they are intended to carry. Attention is also directed to the fact that in case one of the spokes becomes broken or otherwise injured, it may be easily and quickly removed and replaced by a new spoke, by merely manipulating two bolts, that is, one at each end of the spoke.

What I claim is:

1. In a wheel, a hub having a plurality of radial sockets, a rim, a plurality of spring spokes each formed with a pair of coacting leaves lying against each other and a return bend connecting the leaves at one end of the spoke, one of said leaves being offset from the other leaf to provide a head for engaging respectively in the sockets and to likewise provide a lateral shoulder at the inner end of the head, clamp members extending through said hub and engaging said shoulder, and means for connecting said spokes at their outer ends to said rim.

2. As a new article of manufacture, a spring spoke for vehicle wheels, including a pair of co-acting leaves lying against each other, and a return-bend connecting the leaves at one end of the spoke, one of said leaves being offset away from the other at a point spaced apart from but in proximity to the bend, to provide a head at the said end of the spoke.

In testimony whereof I affix my signature in presence of two witnesses.

WILLIAM T. DULANY, Jr. [L. S.]

Witnesses:
JOHN CARLISLE LOUDON,
JOHN F. OPDYCKE.